United States Patent
Liu

(10) Patent No.: US 9,461,682 B2
(45) Date of Patent: Oct. 4, 2016

(54) METHOD AND SYSTEM FOR FILTERING OUT ADJACENT FREQUENCY BAND INTERFERENCE

(71) Applicant: ZTE Corporation, Shenzhen, Guangdong (CN)

(72) Inventor: Teng Liu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/439,319

(22) PCT Filed: Jun. 24, 2013

(86) PCT No.: PCT/CN2013/077821
§ 371 (c)(1),
(2) Date: Apr. 29, 2015

(87) PCT Pub. No.: WO2013/167007
PCT Pub. Date: Nov. 14, 2013

(65) Prior Publication Data
US 2015/0295606 A1    Oct. 15, 2015

(30) Foreign Application Priority Data
Oct. 30, 2012    (CN) .......................... 2012 1 0424072

(51) Int. Cl.
*H04B 1/44*    (2006.01)
*H04B 1/12*    (2006.01)
(Continued)

(52) U.S. Cl.
CPC .............. *H04B 1/123* (2013.01); *H01Q 1/521* (2013.01); *H04B 1/109* (2013.01); *H04B 1/1036* (2013.01); *H04B 1/50* (2013.01); *H04B 1/0064* (2013.01)

(58) Field of Classification Search
CPC ... H04W 16/14; H04W 24/10; H04W 24/00; H04W 28/04; H04B 1/1027; H04B 11/48; H04B 1/44; H04B 1/525; H04B 1/406; H04B 1/18
USPC ............... 455/63.1–63.3, 76–78, 101, 114.2, 455/118–120, 296–299, 307, 313, 334, 455/550.1, 552.1
See application file for complete search history.

(56) References Cited

U.S. PATENT DOCUMENTS

| 5,231,407 A | 7/1993 | McGirr |
| 5,940,452 A * | 8/1999 | Rich .................... H04B 7/0857 375/347 |

(Continued)

FOREIGN PATENT DOCUMENTS

| CN | 101640317 A | 2/2010 |
| CN | 102522630 A | 6/2012 |

(Continued)

OTHER PUBLICATIONS

International Search Report in international application No. PCT/CN2013/077821, mailed on Sep. 19, 2013.

(Continued)

*Primary Examiner* — Nhan Le
(74) *Attorney, Agent, or Firm* — Oppedahl Patent Law Firm LLC

(57) ABSTRACT

Provided are a method and a system for filtering out adjacent frequency band interference. The method includes that an RF MEMS switch control module receives a first transmitted coupling signal from a first frequency band RF module and a second received coupling signal from a second frequency band RF module; the RF MEMS switch control module determines whether interference exists between a first frequency band and a second frequency band according to the first transmitted coupling signal and the second received coupling signal; if interference exists, the RF MEMS switch control module filters out the interference by instructing a first frequency band RF MEMS radio frequency reconfigurable antenna working in the first frequency band to change a first antenna structure and/or by instructing a second frequency band RF MEMS radio frequency reconfigurable antenna working in the second frequency band to change a second antenna structure. By means of the disclosure, adjacent frequency bands can co-exist on hardware and mutual interference is effectively avoided.

6 Claims, 4 Drawing Sheets

(51) Int. Cl.
*H04B 1/10* (2006.01)
*H04B 1/50* (2006.01)
*H01Q 1/52* (2006.01)
*H04B 1/00* (2006.01)

(56) References Cited

U.S. PATENT DOCUMENTS

| | | |
|---|---|---|
| 6,061,024 A | 5/2000 | McGirr |
| 6,311,045 B1 | 10/2001 | Domokos |
| 7,589,674 B2 | 9/2009 | Anagnostou |
| 2009/0207091 A1 | 8/2009 | Anagnostou |
| 2010/0302106 A1 | 12/2010 | Knudsen |
| 2012/0264473 A1* | 10/2012 | Mujtaba ............... H04W 68/00 455/515 |
| 2012/0293384 A1 | 11/2012 | Knudsen |
| 2015/0079913 A1 | 3/2015 | Knudsen |

FOREIGN PATENT DOCUMENTS

| | | |
|---|---|---|
| CN | 102983870 A | 3/2013 |
| WO | 2011116289 A1 | 9/2011 |

OTHER PUBLICATIONS

English Translation of the Written Opinion of the International Search Authority in international application No. PCT/CN2013/077821, mailed on Sep. 19, 2013.

Supplementary European Search Report in European application No. 13788114.0, mailed on Nov. 19, 2015.

\* cited by examiner

METHOD AND SYSTEM FOR FILTERING OUT ADJACENT FREQUENCY BAND INTERFERENCE

TECHNICAL FIELD

The disclosure relates to a communication technology and in particular to a method and system for filtering out adjacent frequency band interference.

BACKGROUND

The vigorous development in the wireless communication field makes spectrum resources become increasingly short, and it has been a focus of attention to fully utilize spectrum resources in a narrow spectrum space without causing mutual interference with other frequency bands. From the aspect of hardware, there are roughly two solutions as follows to avoid mutual interference:

(1) a method of improving insulation of adjacent frequency bands, which requires an antenna system provided with high isolation to filter out interference of a sideband; in practice, however, it is not easy to design an antenna system provided with high isolation and a ultra-wide band characteristic at the same time; besides, a filter with excellent performance further needs to be added to a transmitting terminal and a receiving terminal sometimes to further improve insulation of adjacent frequency bands; and (2) through a method of changing a polarization of an antenna, e.g. a signal uses horizontal polarization or left-hand circular polarization while another signal with a similar frequency may use vertical polarization or right-hand circular polarization; such a method is widely used in the field of satellite communication; however, the solution can be hardly applied in the field of mobile communications due to uncertainties of mobile terminal locations.

A reconfigurable antenna, which is a new antenna technical idea in recent years, changes an electrical length or current trend of an antenna to change an antenna radiation pattern, polarization or frequency so as to exhibit characteristics of various antennae on one pair of antennae, e.g. re-configurability. With the mature development of Radio Frequency Micro Electro Mechanical System (RF MEMS) switch technology, the application of reconfigurable antennae has achieved greater development.

However, there is no method for solving mutual interference between adjacent frequency bands by using a reconfigurable antenna in the prior art.

SUMMARY

In view of this, the main purpose of the disclosure is to provide a method and system for filtering out adjacent frequency band interference so as to avoid mutual interference between adjacent frequency bands by using a reconfigurable antenna.

To realize the purpose above, the technical solution of the disclosure is implemented by the following way.

A method for filtering out adjacent frequency band interference includes:

an RF MEMS switch control module receives a first transmitted coupling signal from a first frequency band RF module and a second received coupling signal from a second frequency band RF module, wherein the first frequency band RF module works in a first frequency band and the second frequency band RF module works in a second frequency band; and the RF MEMS switch control module determines whether interference exists between the first frequency band and the second frequency band according to the first transmitted coupling signal and the second received coupling signal; if interference exists, the RF MEMS switch control module filters out the interference by instructing a first frequency band RF MEMS antenna working in the first frequency band to change a first antenna structure and/or by instructing a second frequency band RF MEMS antenna working in the second frequency band to change a second antenna structure.

Preferably, the first transmitted coupling signal may be formed by coupling, through the first frequency band RF module, a predetermined proportion of energy of a digital baseband signal which needs to be sent, to the RF MEMS switch control module; and the second received coupling signal may be formed by coupling, through the second frequency band RF module, a predetermined proportion of energy of a demodulated received digital baseband signal, to the RF MEMS switch control module.

Preferably, a first working frequency band group of the first frequency band RF MEMS antenna may be reconfigurable and may include at least two different working frequency bands; and a second working frequency band group of the second frequency band RF MEMS antenna may be reconfigurable and may include at least two different working frequency bands;

wherein a frequency band section of the second working frequency band group is adjacent to a frequency band section of the first working frequency band group.

Preferably, the method may be applied to a Long Term Evolution (LTE) Band 7 network and a Wireless Fidelity (WIFI) network.

Preferably, the method may be applied to an LTE Band 40 network and a WIFI network.

A system for filtering out adjacent frequency band interference includes:

a first frequency band RF module, configured to send an RF MEMS switch control module a first transmitted coupling signal, wherein the first frequency band RF module works in a first frequency band;

a second frequency band RF module, configured to send the RF MEMS switch control module a second received coupling signal, wherein the second frequency band RF module works in a second frequency band; and the RF MEMS switch control module, configured to determine, after receiving the first transmitted coupling signal and the second received coupling signal, whether interference exists between the first frequency band and the second frequency band according to the first transmitted coupling signal and the second received coupling signal, and if interference exists, to filter out the interference by instructing a first frequency band RF MEMS antenna working in the first frequency band to change a first antenna structure and/or by instructing a second frequency band RF MEMS antenna working in the second frequency band to change a second antenna structure.

Preferably, the first frequency band RF module may be further configured to couple to the RF MEMS switch control module a predetermined proportion of energy of a digital baseband signal which needs to be sent and form the first transmitted coupling signal; and the second frequency band RF module may be further configured to couple to the RF MEMS switch control module a predetermined proportion of energy of a demodulated received digital baseband signal and form the second received coupling signal.

Preferably, a first working frequency band group of the first frequency band RF MEMS antenna may be reconfigurable and may include at least two different working frequency bands; and a second working frequency band group of the second frequency band RF MEMS antenna may be reconfigurable and may include at least two different working frequency bands;

wherein a frequency band section of the second working frequency band group is adjacent to a frequency band section of the first working frequency band group.

Preferably, the system may be applied to an LTE Band 7 network and a WIFI network.

Preferably, the system may be applied to an LTE Band 40 network and a WIFI network.

According to the disclosure, the problem in the prior art that there is no method for solving mutual interference between adjacent frequency bands by using a reconfigurable antenna is solved by applying a method for filtering out interference or mutual interference between adjacent frequency bands using a hardware antenna communication system formed by reconfigurable antennae, thus further achieving co-existence of adjacent frequency bands on hardware, and effectively avoiding mutual interference.

DETAILED DESCRIPTION

The disclosure will be further described in details below with reference to the accompanying drawings and embodiments. It should be noted that, if there is no conflict, the embodiments in the disclosure and the characteristics in the embodiments may be combined with each other.

Figure 1:
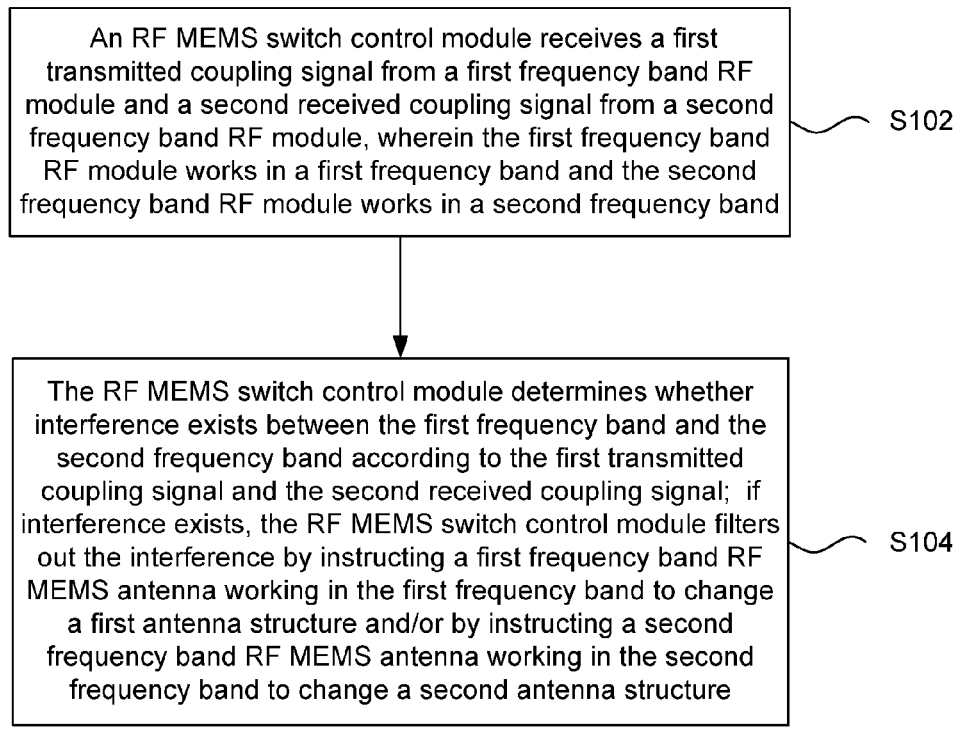
FIG. 1 is a flowchart of implementing a method for filtering out adjacent frequency band interference of an embodiment of the disclosure.

FIG. 1 is a flowchart of implementing a method for filtering out adjacent frequency band interference of an embodiment of the disclosure. As shown in FIG. 1, the method mainly includes the following steps:

Step 102: an RF MEMS switch control module receives a first transmitted coupling signal from a first frequency band RF module and a second received coupling signal from a second frequency band RF module, wherein the first frequency band RF module works in a first frequency band and the second frequency band RF module works in a second frequency band; and Step 104: the RF MEMS switch control module determines whether interference exists between the first frequency band and the second frequency band according to the first transmitted coupling signal and the second received coupling signal; if interference exists, the RF MEMS switch control module filters out the interference by instructing a first frequency band RF MEMS antenna working in the first frequency band to change a first antenna structure and/or by instructing a second frequency band RF MEMS antenna working in the second frequency band to change a second antenna structure.

In the present embodiment, the first transmitted coupling signal is formed by coupling, through the first frequency band RF module, a predetermined proportion of energy of a digital baseband signal which needs to be sent, to the RF MEMS switch control module; the second received coupling signal is formed by coupling, through the second frequency band RF module, a predetermined proportion of energy of a demodulated received digital baseband signal, to the RF MEMS switch control module.

In the present embodiment, a first working frequency band group of the first frequency band RF MEMS antenna is reconfigurable and includes at least two different working frequency bands; a second working frequency band group of the second frequency band RF MEMS antenna is reconfigurable and includes at least two different working frequency bands, wherein a frequency band section of the second working frequency band group is adjacent to that of the first working frequency band group.

Preferably, the method may be applied to an LTE Band 7 network and a WIFI network.

Preferably, the method may be applied to an LTE Band 40 network and a WIFI network.

Figure 2:
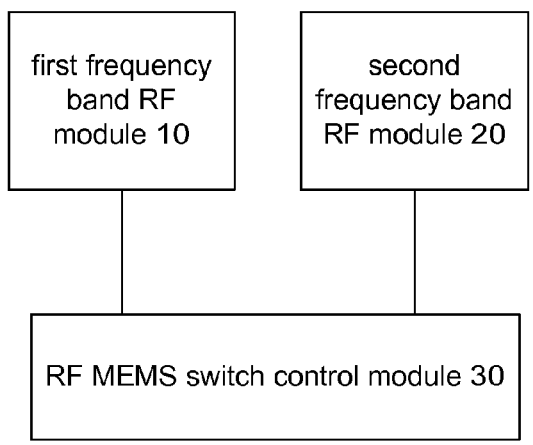
FIG. 2 is a structural composition diagram of a system for filtering out adjacent frequency band interference of an embodiment of the disclosure.

FIG. 2 is a structural composition diagram of a system for filtering out adjacent frequency band interference according to an embodiment of the disclosure. The system is configured to implement the method for filtering out adjacent frequency band interference in the embodiment above. As shown in FIG. 2, the system includes a first frequency band RF module 10, a second frequency band RF module 20 and an RF MEMS switch control module 30, wherein the first frequency band RF module 10 is configured to send a first transmitted coupling signal to an RF MEMS switch control module, wherein the first frequency band RF module works in a first frequency band;

the second frequency band RF module 20 is configured to send a second received coupling signal to the RF MEMS switch control module, wherein the second frequency band RF module works in a second frequency band;

the RF MEMS switch control module 30 is connected to both the first frequency band RF module 10 and the second frequency band RF module 20, and is configured to determine, after receiving the first transmitted coupling signal and the second received coupling signal, whether interference exists between the first frequency band and the second frequency band according to the first transmitted coupling signal and the second received coupling signal, and if interference exists, to filter out the interference by instructing a first frequency band RF MEMS antenna working in the first frequency band to change a first antenna structure and/or by instructing a second frequency band RF MEMS antenna working in the second frequency band to change a second antenna structure.

Preferably, the first frequency band RF module is further configured to couple a predetermined proportion of energy of a digital baseband signal which needs to be sent, to the RF MEMS switch control module, and to form the first transmitted coupling signal;

the second frequency band RF module is further configured to couple a predetermined proportion of energy of a demodulated received digital baseband signal to the RF MEMS switch control module and to form the second received coupling signal.

In the present embodiment, a first working frequency band group of the first frequency band RF MEMS antenna is reconfigurable and includes at least two different working frequency bands; a second working frequency band group of the second frequency band RF MEMS antenna is reconfigurable and includes at least two different working frequency bands, wherein a frequency band section of the second working frequency band group is adjacent to that of the first working frequency band group.

In the present embodiment, the system may be applied to an LTE Band 7 network and a WIFI network.

In the present embodiment, the system may be applied to an LTE Band 40 network and a WIFI network.

A method and system for filtering out adjacent frequency band interference will be described in details below in conjunction with FIG. 3 to FIG. 7 and specific embodiments.

Figure 3:
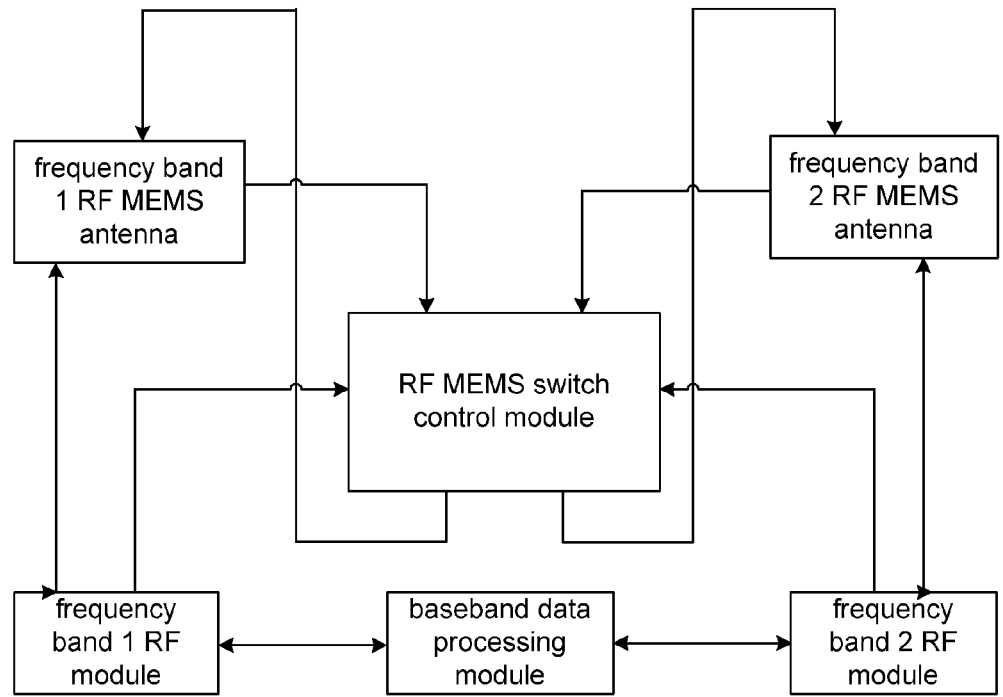
FIG. 3 is a structural composition diagram of an adjacent frequency band interference filtering out system working in adjacent frequency bands and provided with a reconfigurable antenna according to an embodiment of the disclosure.

FIG. 3 is a structural composition diagram of an adjacent frequency band interference filtering out system working in adjacent frequency bands and provided with a reconfigurable antenna according to an embodiment of the disclosure. As shown in FIG. 3, hardware modules included in the system include a frequency band 1 RF module, a frequency band 2 RF module, a baseband data processing module, an antenna group (including a frequency band 1 RF MEMS antenna and a frequency band 1 RF MEMS antenna) provided with an intelligent controllable RF MEMS switch, and an RF MEMS switch control module and etc., wherein the frequency band 1 RF module works in working frequency band 1 and the frequency band 2 RF module works in working frequency band 2. All modules will be introduced briefly as below.

The frequency band 1 RF module is mainly for completing modulation of a transmitted digital baseband signal to make the transmitted digital baseband signal satisfy a required radio frequency index so that the transmitted digital baseband signal can be transmitted in a space, and simultaneously, demodulating a frequency band 1 radio frequency signal received in the space so that the frequency band 1 radio frequency signal is changed into a corresponding digital baseband signal; and the baseband data processing module completes related data operations subsequently.

The frequency band 2 RF module is mainly for completing modulation of a transmitted digital baseband signal to make the transmitted digital baseband signal satisfy a required radio frequency index so that the transmitting digital baseband signal can be transmitted in a space, and simultaneously, demodulating a frequency band 2 radio frequency signal received in the space so that the frequency band 2 radio frequency signal is changed into a corresponding digital baseband signal; and the baseband data processing module completes related data operations subsequently.

The baseband data processing module is mainly for completing processing of a baseband signal in frequency band 1 and a baseband signal in frequency band 2 and for finish the work at a protocol layer to complete transmission and interaction between digital signals of the two frequency bands, realizing wireless data transmission and ensuring the accuracy and normalization of wireless access.

The RF MEMS antenna group (including the frequency band 1 RF MEMS antenna and the frequency band 1 RF MEMS antenna) is mainly for completing transmitting and receiving of a signal of frequency band 1 and a signal of frequency band 2. The introduction of RF MEMS switch technology makes the design of an antenna have a more explicit direction and can realize communication in an actually required communication frequency band through handover of an antenna switch. Taking frequency re-configurability for example, a working frequency band can be selected reasonably through connection and disconnection of the antenna switch, thus alleviating the design pressure brought about by a single antenna due to a wide bandwidth.

Figure 4:
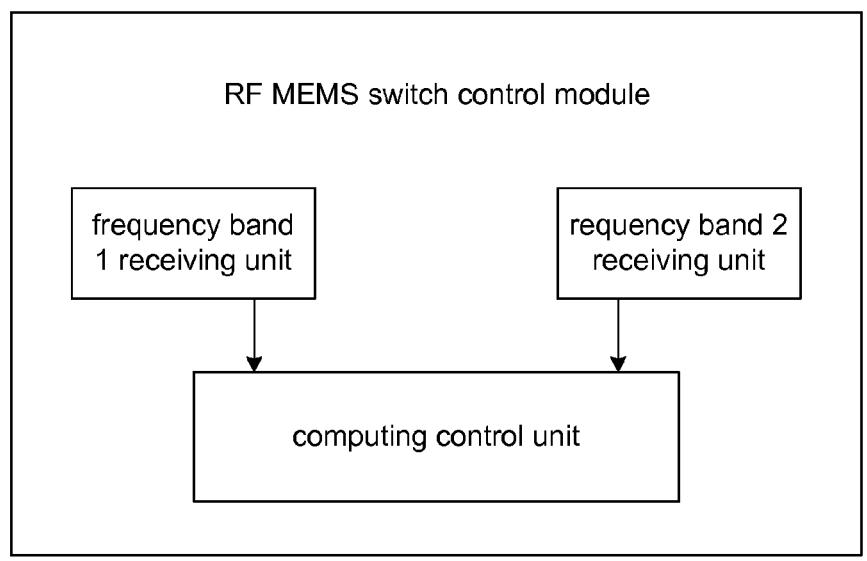
FIG. 4 is a schematic diagram of a working principle of an RF MEMS switch control module according to an embodiment of the disclosure.

The RF MEMS switch control module is mainly for monitoring a state of the whole system during working in real time, and responding, through determining whether mutual interference exists between two or among a plurality of working frequency bands, to antenna control. Referring to FIG. 4, the RF MEMS switch control module includes a frequency band 1 receiving unit, a frequency band 2 receiving unit and a computing control unit, wherein the frequency band 1 receiving unit is configured to compare a frequency band 1 transmitted coupling signal and a frequency band 2 received coupling signal and then feed back the comparison result to the computing control unit; the frequency band 2 receiving unit is configured to compare a frequency band or 2 transmitted coupling signal and a frequency band or 1 received coupling signal and to feed back the comparison result to the computing control unit; the computing control unit is configured to gather the feedback information from the two receiving units so as to control the RF MEMS switch to change an antenna structure, thus effectively avoiding mutual interference between two adjacent frequency bands. Generally, the mutual interference may be strong or weak. If the mutual interference is not strong, it is only needed to control a working state of only one antenna (e.g. if frequency band 1 only has weak interference to frequency band 2, a transmitting antenna of frequency band 1 or a receiving antenna of frequency band 2 may be enabled to change a working state to inhibit mutual interference); if the mutual interference is strong, working states of transmitting and receiving antennae may be controlled at the same time (e.g. if frequency band 1 has strong interference to frequency band 2, interference of a transmitting sideband of frequency band 1 may be inhibited through changing an antenna pattern of frequency band 1; in the meanwhile, the interference of the transmitting sideband of frequency band 1 is also filtered out through changing a working pattern of antenna 2). In addition, the situation of simultaneously changing the patterns of two antennae is common in the case that two signals are both in a time-division working mode. If one signal is in a frequency-division working mode, it generally needs to only change the pattern of one antenna.

The baseband data processing module is configured to process baseband digital signals of two frequency bands and to implement information interaction and feedback.

In a working process, after receiving a signal sent by the baseband data processing module, the frequency band 1 RF module amplifies the signal through simulated amplification, and radiates the signal through a corresponding antenna thereof. Similarly, the frequency band 2 RF module also spreads information through an RF MEMS antenna of frequency band 2. While radiating energy, frequency band 1 also couples a very small portion of energy into the RF MEMS switch control module. At the same time, the RF MEMS antenna of frequency band 2 also couples a small portion of energy of the received signal into the RF MEMS switch control module. The two coupled signals will be compared and analyzed in the RF MEMS switch control module. Similarly, the frequency band 2 RF module also couples a very small portion of radiated energy to the RF MEMS switch control module, and an frequency band 1 antenna also couples a small portion of energy of a received signal to the RF MEMS switch control module, and comparison and analysis are finally performed in the RF MEMS switch control module. The RF MEMS switch control module feeds back the analysis result to RF MEMS reconfigurable antennae of the two frequency bands, and switches and selects an antenna working state through the RF MEMS switch.

FIG. 4 is a schematic diagram of a working principle of an RF MEMS switch control module according to an embodiment of the disclosure. As shown in FIG. 4, the RF MEMS switch control module has two receiving units provided with two frequency bands, which are a frequency band 1 receiving unit and a frequency band 2 receiving unit respectively. The two receiving units analyze, through comparing coupling signals, whether there is an interference factor in the signals, and then feed back the analysis result to a central control unit. A computing control unit gathers two analysis results, and sends out an instruction for changing an antenna working state. The instruction controls RF MEMS antennae of the two frequency bands simultaneously so as to realize reasonable combination and matching and finally eliminate interference.

Figure 5:
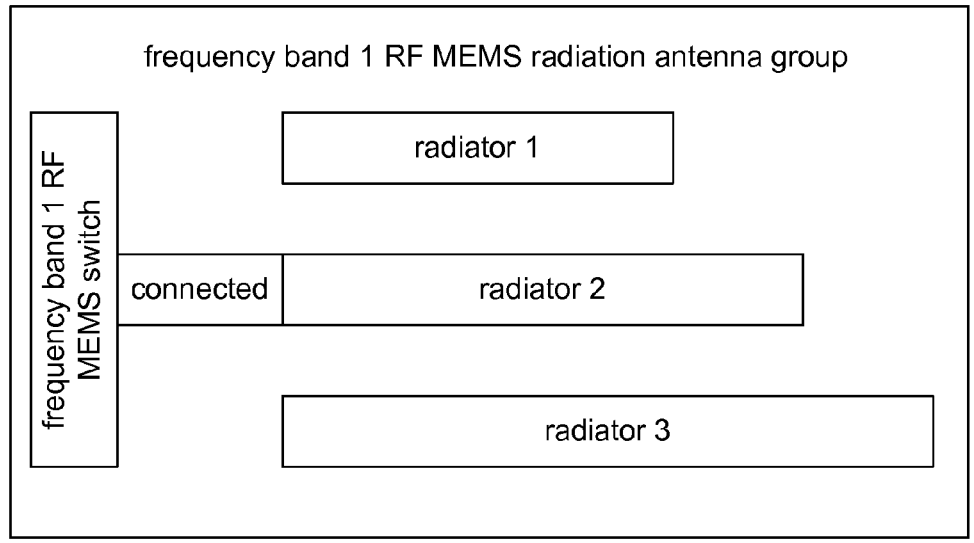
FIG. 5 is a structural diagram of an RF MEMS antenna working in frequency band 1 according to an embodiment of the disclosure.
Figure 6:
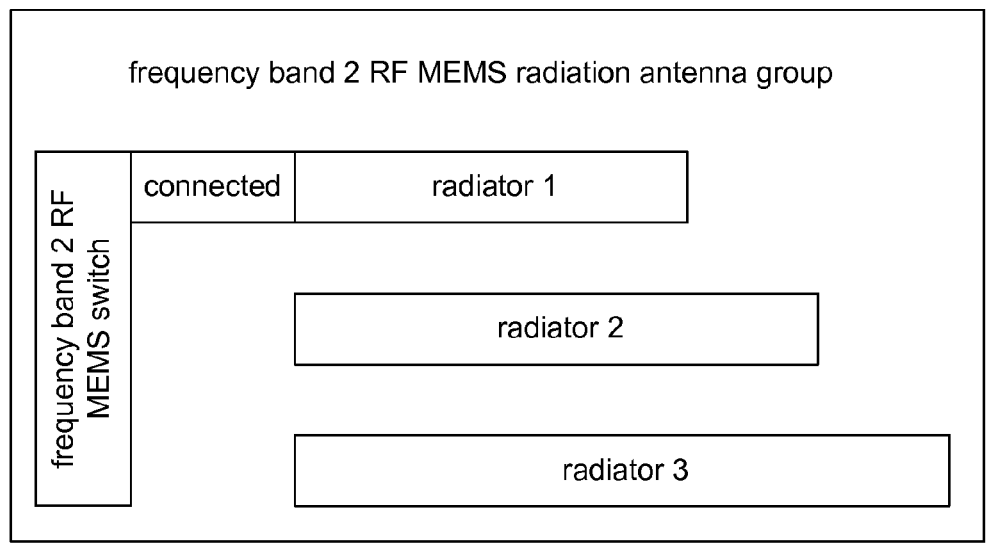
FIG. 6 is a structural diagram of an RF MEMS antenna working in frequency band 2 according to an embodiment of the disclosure.

Referring to FIG. 5 and FIG. 6, FIG. 5 is a structural diagram of an RF MEMS antenna working in frequency band 1 according to an embodiment of the disclosure and FIG. 6 is a structural diagram of an RF MEMS antenna working in frequency band 2 according to an embodiment of the disclosure. FIG. 5 and FIG. 6 take a frequency reconfigurable antenna as an example. A switch switches to different radiators, which means the switch works in different frequency bands. An antenna working state depends on a control instruction of an RF MEMS switch control module.

Figure 7:
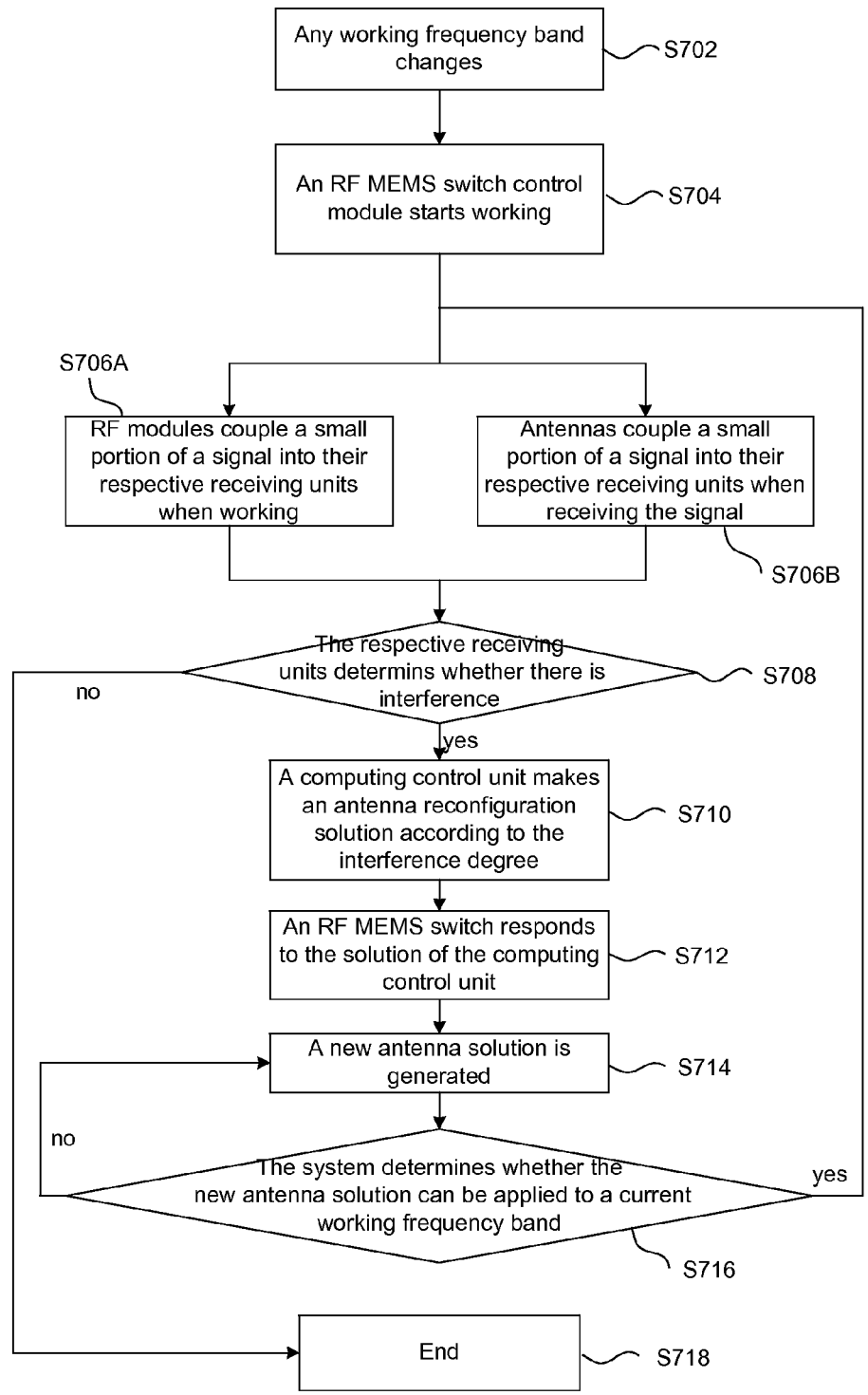
FIG. 7 is a flowchart illustrating a system for filtering out adjacent frequency band interference working in two frequency bands according to an embodiment of the disclosure.

FIG. 7 is a flowchart illustrating a system for filtering out adjacent frequency band interference working in two frequency bands according to an embodiment of the disclosure. The process includes the following steps:

Step S702: any working frequency band of the system changes;

Step S704: an RF MEMS switch control module starts working;

Step S706A: when transmitting a signal, frequency band RF modules couple a small portion of the signal to their respective receiving units;

Step S706B: when receiving a signal, RF MEMS antennas also couple a small portion of the signal to their respective receiving units;

Step S708: the respective receiving units determine, through information comparison, whether interference exists, and if interference exists, each of the respective receiving units feeds back an analysis result to a computing control unit and Step S710 is performed; and if interference does not exist, Step S718 is performed;

Step S710: the computing control unit makes an antenna reconfiguration solution according to the interference degree;

Step S712: an RF MEMS system responds to an instruction sent by the computing control unit according to the antenna reconfiguration solution;

Step 714: an antenna working state is changed and a new antenna solution is generated;

Step 716: the system determines whether a current antenna combination is applicable to a current working frequency band; if not applicable, Step 714 is performed and an antenna combination solution is re-adjusted; if applicable, Step 706A and Step 706B is performed and not stopped until each receiving unit determines that there is no mutual interference existing between adjacent frequency bands, and then Step 718 is performed; and Step 718: the process ends.

By applying a method and system for filtering out adjacent frequency band interference according to the embodiments above, the problem in the prior art that there is no method for solving mutual interference between adjacent frequency bands by using a reconfigurable antenna is solved, thus further achieving co-existence of adjacent frequency bands on hardware, and the effectively avoiding mutual interference.

It can be seen from the description above that the disclosure achieves the following technical effect: by applying a method for filtering out interference or mutual interference between adjacent frequency bands using a hardware antenna communication system formed by reconfigurable antennae, the problem in the prior art that there is no method for solving mutual interference between adjacent frequency bands by using a reconfigurable antenna is solved, thus further achieving co-existence of adjacent frequency bands on hardware, and effectively avoiding mutual interference.

It should be understood by those skilled in the art that functions realized by each module or each step in the above embodiments of the disclosure may be implemented with a general-purpose computing apparatus. The functions realized by each module or each step may be integrated into a single computing apparatus or distributed on a network consisting of a plurality of computing apparatuses. Preferably, the functions realized by each module or each step can be implemented with program codes executable by a computing apparatus, so that the program codes may be stored in a storage apparatus and executed by a computing apparatus. In addition, the steps as illustrated or described may be executed according to a sequence different from that of the steps in the embodiments of the disclosure. Or, the functions realized by each module or each step are realized by making them into respective integrated circuit modules, or functions realized by a plurality of modules or steps among the functions realized by the modules or steps are realized by making them into a single integrated circuit module. In this way, the disclosure is not limited to any specific combination of hardware and software.

The foregoing descriptions are only preferred embodiments of the disclosure and are not used for limiting the disclosure. For those skilled in the art, the disclosure may have various alternations and changes. All modifications, equivalent replacements and improvements and the like made within the spirit and principle of the disclosure shall be included within the protection scope of the disclosure.

What is claimed is:

1. A method for filtering out adjacent frequency band interference, comprising:
  receiving, by a Radio Frequency Micro Electro Mechanical System (RF MEMS) switch control module, a first transmitted coupling signal from a first frequency band RF module and a second received coupling signal from a second frequency band RF module, wherein the first frequency band RF module works in a first frequency band and the second frequency band RF module works in a second frequency band; and determining, by the RF MEMS switch control module, whether interference exists between the first frequency band and the second frequency band according to the first transmitted coupling signal and the second received coupling signal; if interference exists, filtering out, by the RF MEMS switch control module, the interference by instructing a first frequency band RF MEMS antenna working in the first frequency band to change a first antenna structure and/or by instructing a second frequency band RF MEMS antenna working in the second frequency band to change a second antenna structure;

wherein the first transmitted coupling signal is formed by coupling, through the first frequency band RF module, a predetermined proportion of enemy of a digital baseband signal which needs to be sent, to the RF MEMS switch control module; and the second received coupling signal is formed by coupling, through the second frequency band RF module, a predetermined proportion of enemy of a demodulated received digital baseband signal, to the RF MEMS switch control module;

wherein a first working frequency band group of the first frequency band RF MEMS antenna is reconfigurable and comprises at least two different working frequency bands; and a second working frequency band group of the second frequency band RF MEMS antenna is reconfigurable and comprises at least two different working frequency bands;

wherein a frequency band section of the second working frequency band group is adjacent to a frequency band section of the first working frequency band group.

2. The method according to claim 1, wherein the method is applied to a Long Term Evolution (LTE) Band 7 network and a Wireless Fidelity (WIFI) network.

3. The method according to claim 1, wherein the method is applied to an LTE Band 40 network and a WIFI network.

4. A system for filtering out adjacent frequency band interference, comprising:

a first frequency band RF module, configured to send a Radio Frequency Micro Electro Mechanical System (RF MEMS) switch control module a first transmitted coupling signal, wherein the first frequency band RF module works in a first frequency band;

a second frequency band RF module, configured to send the RF MEMS switch control module a second received coupling signal, wherein the second frequency band RF module works in a second frequency band; and the RF MEMS switch control module, configured to determine, after receiving the first transmitted coupling signal and the second received coupling signal, whether interference exists between the first frequency band and the second frequency band according to the first transmitted coupling signal and the second received coupling signal, and if interference exists, to filter out the interference by instructing a first frequency band RF MEMS antenna working in the first frequency band to change a first antenna structure and/or by instructing a second frequency band RF MEMS antenna working in the second frequency band to change a second antenna structure;

wherein the first frequency band RF module is further configured to couple a predetermined proportion of enemy of a digital baseband signal which needs to be sent, to the RF MEMS switch control module and to form the first transmitted coupling signal; and the second frequency band RF module is further configured to couple a predetermined proportion of enemy of a demodulated received digital baseband signal to the RF MEMS switch control module and to form the second received coupling signal;

wherein a first working frequency band group of the first frequency band RF MEMS antenna is reconfigurable and comprises at least two different working frequency bands; and a second working frequency band group of the second frequency band RF MEMS antenna is reconfigurable and comprises at least two different working frequency bands;

wherein a frequency band section of the second working frequency band group is adjacent to a frequency band section of the first working frequency band group.

5. The system according to claim 4, wherein the system is applied to a Long Term Evolution (LTE) Band 7 network and a Wireless Fidelity (WIFI) network.

6. The system according to claim 4, wherein the system is applied to an LTE Band 40 network and a WIFI network.

* * * * *